US012744575B2

(12) United States Patent
So et al.

(10) Patent No.: US 12,744,575 B2
(45) Date of Patent: Sep. 22, 2026

(54) ELECTRONIC DEVICE AND METHOD TO PERFORM UNIVERSAL LEARNING-BASED CHANNEL STATE INFORMATION COMPRESSION

(71) Applicant: Samsung Electronics Co., Ltd., Gyeonggi-do (KR)

(72) Inventors: Jin Hyun So, San Diego, CA (US); Hyuk Joon Kwon, San Diego, CA (US); Kee-Bong Song, San Diego, CA (US)

(73) Assignee: Samsung Electronics Co., Ltd (KR)

(*) Notice: Subject to any disclaimer, the term of this patent is extended or adjusted under 35 U.S.C. 154(b) by 385 days.

(21) Appl. No.: 18/486,571

(22) Filed: Oct. 13, 2023

(65) Prior Publication Data

US 2024/0348303 A1 Oct. 17, 2024

Related U.S. Application Data

(60) Provisional application No. 63/458,563, filed on Apr. 11, 2023.

(51) Int. Cl.
*H04B 7/06* (2006.01)

(52) U.S. Cl.
CPC ......... *H04B 7/0626* (2013.01); *H04B 7/0658* (2013.01)

(58) Field of Classification Search
CPC .. H04B 7/0456; H04B 7/0626; H04B 7/0628; H04B 7/0632; H04B 7/0658
See application file for complete search history.

(56) References Cited

U.S. PATENT DOCUMENTS

2013/0343327 A1* 12/2013 Jang .................... H04L 1/0073 370/329
2022/0352956 A1 11/2022 Ahmed Salem et al.
2023/0041413 A1 2/2023 Lyashev et al.
2023/0084164 A1 3/2023 Chen et al.
2025/0045587 A1* 2/2025 Jin .................... G06N 3/045
2025/0070910 A1* 2/2025 Liu .................... H04B 7/0632
2025/0096972 A1* 3/2025 Li .................... H04B 7/0456
2025/0220480 A1* 7/2025 Zhang .................. G06N 3/0455

FOREIGN PATENT DOCUMENTS

CN 115549742 12/2022
WO WO 2022/040655 2/2022

OTHER PUBLICATIONS

Yunhui Gao, SpotTune: Transfer Learning through Adaptive Fine-tuning, Nov. 21, 2018, pp. 1-10 (Year: 2018).*
Guo, Jiajia et al., "Overview of Deep Learning-based CSI Feedback in Massive MIMO Systems", arXiv:2206.14383v1 [eess.SP] Jun. 29, 2022, pp. 1-28.

(Continued)

*Primary Examiner* — Michael Thier
*Assistant Examiner* — Prince A Mensah
(74) *Attorney, Agent, or Firm* — The Farrell Law Firm, P.C.

(57) ABSTRACT

A system and a method are disclosed. The method includes partitioning channel state information (CSI) into one or more discrete elements based on a predetermined dimension; categorizing the partitioned CSI into one or more bins having an equal length; and encoding the categorized partitioned CSI.

20 Claims, 11 Drawing Sheets

(56) References Cited

OTHER PUBLICATIONS

Kim, Heasung et al. “Learning Variable-Rate Codes for CSI Feedback” In Globecom 2022-2022 IEEE Global Communications Conference, pp. 7.
Weiss, Karl et al., “A survey of transfer learning”, . Journal of Big Data (2016) 3:9, 2016, pp. 41.
Guo, Yunhui et al., “SpotTune: Transfer Learning through Adaptive Fine-tuning”, arXiv:1811.08737v1 [cs.CV] Nov. 21, 2018, pp. 1-10.
Song, Xuan et al., “SALDR: Joint Self-Attention Learning and Dense Refine for Massive MIMO CSI Feedback With Multiple Compression Ratio”, IEEE Wireless Communications Letters, vol. 10, No. 9, Sep. 2021, pp. 1899-1903.
Xu, Yang et al., “Transformer Empowered CSI Feedback for Massive MIMO Systems”, 2021 30th Wireless and Optical Communications Conference (WOCC), © 2021 IEEE, pp. 157-161.
Kim, Yongjun et al., “Channel State Feedback with Neural Networks: A Discrete Representation Learning Approach”, 2022 IEEE Globecom Workshops (GC Wkshps): Workshop on Emerging Topics in 6G Communications, © 2022 IEEE, pp. 184-189.
Ad-hoc Chair (CMCC), “Session notes for 9.2 (Study on AI/ML for NR air interface)”, 3GPP TSG RAN WG1 #109-e R1-220XXXX e-Meeting, May 9-20, 2022, pp. 25.

* cited by examiner

ELECTRONIC DEVICE AND METHOD TO PERFORM UNIVERSAL LEARNING-BASED CHANNEL STATE INFORMATION COMPRESSION

CROSS-REFERENCE TO RELATED APPLICATION

This application claims the priority benefit under 35 U.S.C. § 119(e) of U.S. Provisional Application No. 63/458,563, filed on Apr. 11, 2023, the disclosure of which is incorporated by reference in its entirety as if fully set forth herein.

TECHNICAL FIELD

The disclosure generally relates to a method and a device for performing data compression. More particularly, the subject matter disclosed herein relates to universal learning-based channel state information (CSI) compression.

SUMMARY

In a massive multiple-input multiple-output (MIMO) system, obtaining real-time CSI at the base station (BS) is necessary to maximize the benefits of enhanced MIMO techniques. In frequency division duplexed (FDD) systems, the user equipment (UE) may need to estimate the downlink CSI using reference signals and send information back to the BS. However, the communication overhead for CSI feedback may become burdensome in massive MIMO FDD systems, as it involves a trade-off between CSI distortion and feedback rate.

To address this challenge, compressed sensing (CS) and codebook methods may be utilized, which have been applied to long term evolution (LTE) and fifth generation (5G) networks. However, the complexity of codebook design and the need to exploit the sparsity of CSI increase significantly with the number of transmission and reception antennas, which may be impractical for massive MIMO systems.

Artificial intelligence (AI) or machine learning (ML)-based methods may also be used to compress CSI. Many such methods use an auto-encoder (AE) architecture, where an encoder takes CSI as input and produces a smaller latent vector (e.g., a lower-dimensional representational vector). The decoder then reconstructs the original CSI from this latent vector. A goal of AE is to learn a non-linear manifold of the CSI with fewer dimensions, which helps resolve the high overhead of CSI feedback. AE-based methods may achieve a better trade-off between distortion and feedback rate compared to conventional CS and codebook-based approaches.

AE frameworks typically are designed for specific configurations with a fixed number of antennas, and for resource allocation in the frequency domain. In practice, however, the number of transmitting and receiving antennas can vary across BSs and UEs, and the BS dynamically allocates frequency bandwidth based on channel quality. Therefore, the input dimension of the encoder may change, and the UE may need to employ multiple encoders having various configuration to support different input dimensions. Additionally, the UE may also need to support various latent dimensions (and compression rates) to further reduce communication overhead in CSI feedback based on the channel delay profile.

Designing multiple AE models, each dedicated to supporting a specific pair of input and latent sizes, is impractical due to limited hardware (HW) resources in mobile devices.

To overcome these issues, the present Application proposes a universal ML-based CSI compressor capable of supporting various input and latent sizes while significantly reducing the HW complexity in the UE, without sacrificing performance compared to using multiple encoders.

In an embodiment, a method performed by an electronic device comprises partitioning CSI into one or more discrete elements based on a predetermined dimension; categorizing the partitioned CSI into one or more bins having an equal length; and encoding the categorized partitioned CSI.

In an embodiment, an electronic device comprises a memory device, and a processor configured to execute instructions stored on the memory device, wherein the instructions cause the processor to partition CSI into one or more discrete elements based on a predetermined dimension; categorize the partitioned CSI into one or more bins having an equal length; and encode the categorized partitioned CSI.

In an embodiment, a method performed by an electronic device, comprises obtaining a universal encoding block; determining at least one characteristic of CSI included in the universal encoding block corresponding to a latent vector size; calculating a masking layer based on the latent vector size; and encoding the CSI based on the masking layer to obtain encoded data having a length corresponding to the latent vector size.

In an embodiment, an electronic device comprises a memory device, and a processor configured to execute instructions stored on the memory device, wherein the instructions cause the processor to obtain a universal encoding block; determine at least one characteristic of CSI included in the universal encoding block corresponding to a latent vector size; calculate a masking layer based on the latent vector size; and encode the CSI based on the masking layer to obtain encoded data having a length corresponding to the latent vector size.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
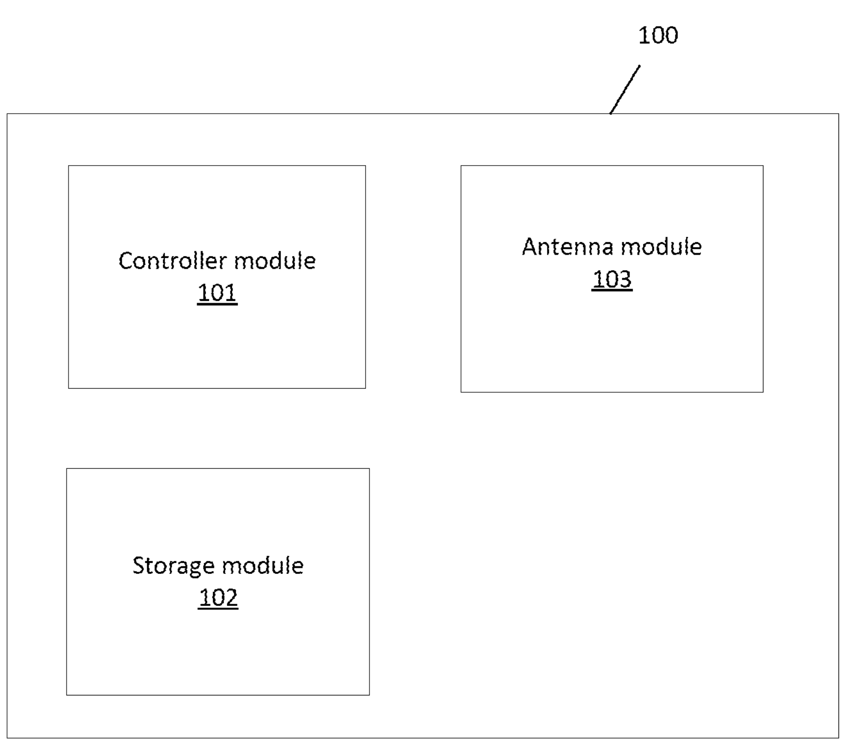
FIG. 1 illustrates a transmitting device or a receiving device in a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 illustrates a transmitting device or a receiving device in a communication system, according to an embodiment.

Referring to FIG. 1, the device 100 may be a UE (e.g., a client device) or a base station (e.g., a gNB) and includes a controller module 101 (e.g., a processor), a storage module 102, and an antenna module 103.

The controller module 101, storage module 102, and antenna module 103 may be structural components to facilitate efficient and accurate transmission or reception of wireless signals. As described herein, the wireless signals (e.g., signals including CSI) that are transmitted may be compressed (e.g., encoded) prior to transmission and reassembled (e.g., decoded) after reception. The device 100 may include all of the structural components necessary to compress, transmit, receive, and/or decompress the wireless signals.

The controller module 101 may include at least one processor and may execute instructions that are stored in the storage module 102. For example, the controller module 101 may execute instructions for performing compression, decompression, and signaling techniques described herein. In addition, the controller module 101 may include a digital signal processor (DSP) for performing signal processing on a signal. The DSP may include one or more processing modules for functions such as synchronization, equalization, and demodulation. The processing modules may be implemented using one or more DSP techniques, such as fast Fourier transform (FFT), inverse FFT (IFFT), and digital filtering. Additionally or alternatively, the controller module 101 may include an application processor for running user applications on the device 100, such as web browsers, video players, and other software applications. The application processor may include one or more processing units, memory devices, and input/output interfaces.

The storage module 102 may include transitory or non-transitory memory storing instructions that, when executed, cause the controller module 101 to perform steps to execute signaling techniques described herein. In addition, the storage module 102 may include a protocol stack for implementing communication protocols. The protocol stack may include one or more layers, such as a physical layer, a medium access control (MAC) layer, a radio link control (RLC) layer, and a packet data convergence protocol (PDCP) layer.

The antenna module 103 may include one or more antennas for wirelessly transmitting and receiving signals to a base station, UE or another device. For example, the antenna module 103 may receive a signal transmitted by a base station and convert it into an electrical signal.

The device 100 may be a receiver of a wireless communication system (e.g., the UE in a 5G NR system) in downlink, i.e., the UE receives and demodulates data transmitted by the gNB. Additionally or alternatively, the UE may modulate (e.g., compress) and transmit signals to the gNB. Also, the device 100 may also transmit a signal via the antenna module 103 and, therefore, may be a transmitter or a gNB.

Accordingly, the ML-based method, described herein, may be implemented on the device 100 (e.g., a UE, BS, or other electronic device), which may employ an AE architecture to compress CSI, which may be sent to a BS to leverage enhanced MIMO techniques. The CSI information H may include channel matrices with real and imaginary parts, denoted as $H \in \mathbb{R}^{2 \times K \times N_{BS} \times N_{UE}}$, where K, $N_{BS}$, $N_{UE}$ respectively represent the number of sub-carriers in the frequency domain, the number of BS antennas, and the number of UE antennas. The CSI matrix $H \in \mathbb{R}^{2 \times K \times N_{BS} \times N_{UE}}$ is partitioned into vectors $h^{part}$ such that each part has a single element in the BS antenna and UE antenna dimensions.

In massive MIMO systems, the large size of H makes transmitting an entire CSI impractical due to computational overhead. Therefore, the UE compresses the CSI to reduce feedback overhead. To achieve this, an AE architecture is proposed, which may include an encoder and/or a decoder comprised in an electronic device. The AE may be structurally equivalent to a processor or controller. Additionally, the AE may be implemented by instructions stored in a memory.

The AE architecture supposes that the encoder compresses the CSI into a smaller latent vector z, which is equal to $f_\phi(H)$, where $z \in \mathbb{R}^{\lambda}$ is a latent vector of size λ and $f_\phi(\cdot)$ denotes the encoding (compression) function with weight parameters φ. The UE sends this compressed latent vector z to the BS, resulting in significant feedback overhead reduction when the compression ratio of the AE is small. Upon receiving z, the BS reconstructs the CSI using the decoder.

The CSI can have different sizes depending on the UE and BS antenna configurations and resource allocation in the frequency domain. Even with a fixed input size, various feedback overhead (and hence the latent size λ) can be configured to optimize the trade-off between distortion and communication overhead.

Accordingly, the present application proposes an electronic device and method for implementing an AE-based CSI feedback framework capable of supporting various input and output dimensionality while efficiently utilizing limited HW resources in the UE. Although portions of the Application describe encoding on the UE side, and decoding on the BS side, other variations are possible. It is recognized that any electronic device capable of storing instructions and/or executing commands may be used to implement some or all of the features of the present Application.

The AE-based CSI feedback framework disclosed herein utilizes input space generalization, latent space generalization, fine-tuning techniques, and/or partial CSI compression. Each of these four techniques may be used individually or in combination to compress, transmit, receive, and/or decompress CSI.

A massive MIMO orthogonal frequency division multiplexing (OFDM) system is provided for implementing the framework, where a single UE and a single BS have a number of antennas $N_{UE}$ and $N_{BS}$, respectively. The BS sends an OFDM transmission with $N_s$ data streams over K sub-carriers. The received signal on the k-th subcarrier can be expressed according to Equation 1, below.

$$y_k = H_k^H V_k x_k + n_k \qquad \text{Equation 1}$$

where $H_k \in \mathbb{C}^{N_{BS} \times N_{UE}}$, $V_k \in \mathbb{C}^{N_{BS} \times N_s}$, $x_k \in \mathbb{C}^{N_s}$, $n_k \in \mathbb{C}^{N_{UE}}$ denotes the channel matrix in the frequency domain, precoding matrix at the BS, downlink transmitted data symbol, and additive white Gaussian noise on the k-th subcarrier, respectively. In addition, H may be represented by {real({$H_1$, $H_2$, . . . , $H_K$}), imag({$H_1$, $H_2$, . . . , $H_K$})}$\in \mathbb{R}^{2 \times K \times N_{BS} \times N_{UE}}$ which may correspond to the entire CSI stacked by the channel matrices on all subcarriers, while real(•) and imag(•) respectively denote the real and imaginary part of the input.

The BS may configure a precoding matrix based on the CSI information H to improve the spectral efficiency with beamforming techniques and/or by eliminating inter-user interference.

To reduce the feedback overhead, the UE can extract the most salient features of the CSI information H by utilizing the AE, which employs the encoder and decoder to respectively compress and reconstruct the CSI. The encoder carries out the compression according to Equation 2, below.

$$z = f_\phi(H) \qquad \text{Equation 2}$$

where $z \in \mathbb{R}^{\lambda}$ is a latent vector of size λ, and $f_\phi(\cdot)$ denotes the compression function with parameters φ. The compression ratio is defined as the ratio between the input and output dimension of the encoder function $f_\phi$, which can be expressed according to Equation 3, below.

$$\text{Compression Ratio}_{f_\phi} \triangleq \frac{\text{size (input of } f_\phi)}{\text{size (output of } f_\phi)} = \frac{\lambda}{2KN_{UE}N_{BS}} \quad \text{Equation 3}$$

where size(•) denotes the number of elements. Also, an unlimited number of representations of continuous features over the latent space may be assumed. In addition, joint optimization of the encoder and quantization may be used to enable discrete representations of the latent space. The UE may send the compressed version of CSI and the latent vector z, to the BS, which significantly reduces the feedback overhead when $\lambda<<2K\ N_{UE}N_{BS}$.

Upon receiving z, the BS may reconstruct the CSI information by executing the decoder, which can be expressed by Equation 4, below.

$$\hat{H} = g_\theta(z) \quad \text{Equation 4}$$

where $g_\theta(\bullet)$ denotes the reconstruction function with a set of parameters $\theta$, and $\hat{H}$ is the reconstructed CSI tensor having the same dimensionality as H.

CSI tensor H can have various dimensionalities according to the UE and BS antenna configurations, and resource allocation over the frequency domain. Various feedback overhead (and hence the latent size $\lambda$) can be configured to optimize the trade-off between distortion and communication overhead. For example, $\Lambda=\{\lambda_1, \lambda_2, \ldots, \lambda_{max}\}$ may be a set of latent sizes; $\lambda_{max}$ may be the maximum value of the latent vector size; and $\mathcal{D}=\{D_1, D_2, \ldots\}$ may be a set of distributions of CSI tensor, and each distribution may have different size. Each distribution may account for variations in the wireless environment, noise conditions, or other factors affecting the channel. For each pair of $(\lambda_i, D_j)\in\Lambda\times\mathcal{D}$, the dedicated pair may be trained to minimize the reconstruction loss, which can be expressed by Equation 5, below.

$$\phi^{opt}_{\lambda_i,D_j}, \theta^{opt}_{\lambda_i,D_j} = \arg\min_{\phi,\theta} \mathbb{E}_{H\sim D_j}\left[L\left(H, g_{\theta_{\lambda_i}}\left(f_{\phi_{\lambda_i}}(H)\right)\right)\right] \quad \text{Equation 5}$$

where $L(\bullet)$ denotes the loss function, and $g_\theta(\bullet)$ denotes the reconstruction function with a set of parameters $\theta$. In a worst case, a number of AE pairs becomes $|\mathcal{D}|\times|\Lambda|$, which can be impractical to be implemented in the UE.

To address this challenge, a universal encoder in the UE is proposed, which minimizes the total loss function, expressed according to Equation 6, below.

$$\phi^{univ}, \{\theta^{opt}_\lambda\}_{\lambda\in\Lambda} = \arg\min_{\phi,\{\theta_\lambda\}_{\lambda\in\Lambda}} \sum_{D\in\mathcal{D}}\sum_{\lambda\in\Lambda} \mathbb{E}_{H\sim D}\left[L(p_D(H), g_{\theta_\lambda}(f_\phi(p_D(H))))\right] \quad \text{Equation 6}$$

where $p_D(\bullet)$ is a pre-processing function to locate the output in the same space $\mathcal{H}$ while the input size of function $p_D$ depends on D. The role of $p_D$ is to make the input of $\phi^{univ}$ have the same size as the output.

A goal is to find the optimal universal encoder $f_\phi: \mathcal{H}\rightarrow\mathbb{R}^{\lambda_{max}}$ from the precoding function $p_D$ such that the AE framework can support arbitrary pairs of the input and latent size (size(D), $\lambda$) for all $D\in\mathcal{D}$, $\lambda\in\Lambda$. The BS may have a decoder $g_{\theta_\lambda}$ for $\lambda\in\Lambda$.

The AE framework may support various input configurations (e.g., various sizes of the CSI tensor) and compression ratios (e.g., various sizes of the latent vector) with limited HW resources of the UE.

For example, the AE framework may employ an input space generalization. As described above, the AE may use the CSI tensor $H\in\mathbb{R}^{2\times K\times N_{BS}\times N_{UE}}$ as an input. The values of $N_{BS}$, $N_{UE}$ and K can be up to 4, 32 and 273, respectively (other values may be used). One problem may be that with the maximum values of input size of the AE, the number of parameters of a simple multiple layer perception (MLP) encoder with one hidden layer, which is one of the simplest neural network encoder models, may be more than 24 million, and due to limited HW resources of the UE, it is not practical to implement. Given the fixed compression ratio (=size(H)/size(z)), the number of parameters of the AE is generally quadratic to size(H). Therefore, input space generalization seeks to reduce the input size while preserving the reconstruction performance as much as possible.

Figure 2:
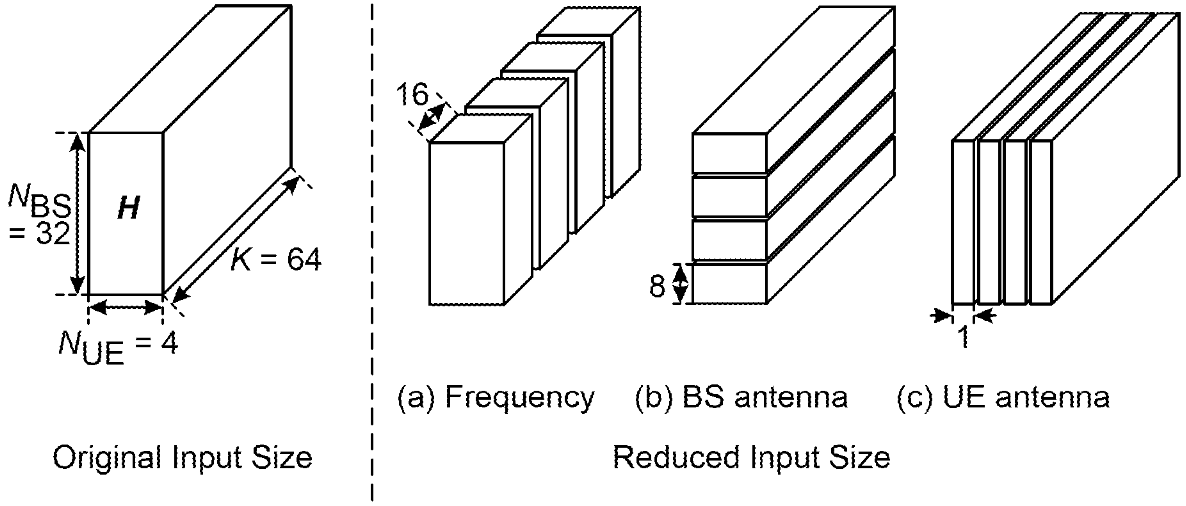
FIG. 2 illustrates a reduced size of the AE data input in three settings, according to an embodiment.

FIG. 2 illustrates a reduced size of the AE data input in three settings, according to an embodiment.

Referring to FIG. 2, K is assumed to be 64, $N_{BS}$ is assumed to be 32, and $N_{UE}$ is assumed to be 4.

To reduce the input dimension of the AE, a partition-based approach where the UE partitions H into multiple parts may be used. Each part can be compressed using the encoder, and the UE may transmit the concatenation of the compressed parts to the BS. Partition can be performed according to the frequency ((a) in FIG. 2), a BS antenna ((b) in FIG. 2) and/or a UE antenna ((c) in FIG. 2). To investigate which dimension is preferrable to be partitioned, the normalized mean square error (NMSE) performance of three settings for $H\in\mathbb{R}^{2\times K(=64)\times N_{BS}(=32)\times N_{UE}(=4)}$ may be partitioned into four input parts with respect to the frequency dimension, BS antenna dimension, and UE antenna dimension. Ideally, the NMSE performance does not degrade even if the same encoder is applied to all of the partitions, thereby reducing the processing burden on HW resources.

The UE antenna dimension and the BS antenna dimension are typically more robust against performance degradation due to partitioning, as compared to the frequency dimension. This is because elements in the frequency dimension tend to be more correlated than the other dimensions, and the sparsity property over the frequency dimension may be compressed. Accordingly, the frequency dimension tends to be most preferrable for compression.

To further reduce the input data size, the amount of block error rate (BLER) performance degradation may be considered when H is partitioned such that each part has a single element in the BS and UE antenna dimensions, (e.g., $h^{part}\in\mathbb{R}^{2\times K\times 1\times 1}$).

The AE can be applied to different antenna configurations in the UE and BS to compress the CSI. The CSI data is represented as a tensor, which can be divided into parts, and the AE model can compress each part efficiently with minimum performance loss.

The CSI tensor has dimensions related to the UE antennas, BS antennas, and frequency. The size of the frequency dimension depends on the allocation of CSI reference signals (CSIRS) and the number of allocated resource blocks RBs. RBs can range from 1 to 273, or more or less. To support different CSIRS resource allocation cases with a single AE, zero-padding is applied in the frequency domain, and an IFFT is used. This enables the AE to handle a wide array of cases efficiently.

Figure 3:
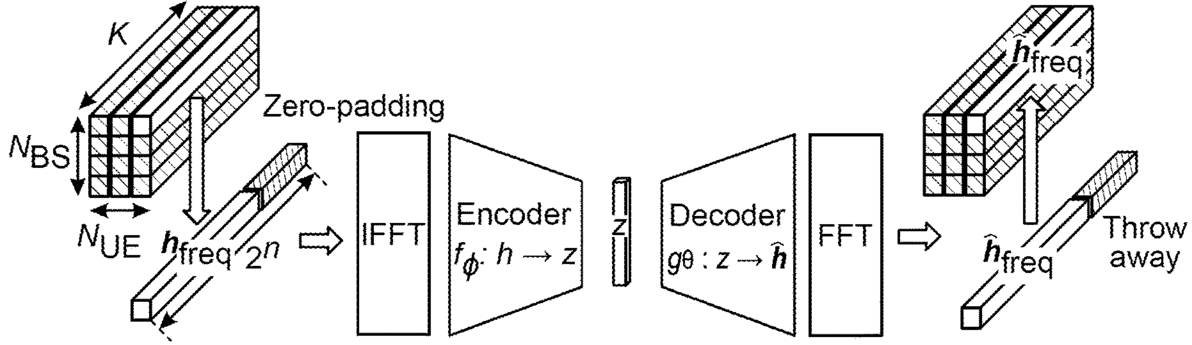
FIG. 3 illustrates an AE-based feedback framework based on an input space generalization, according to an embodiment.

FIG. 3 illustrates an AE-based feedback framework based on an input space generalization, according to an embodiment.

When dealing with just a single RB using the AE designed for 273 RBs, a significant amount of input data is zero, leading to inefficiency in power consumption. To address this, the input size in the frequency domain may be categorized into five cases based on the number of RBs (K). In each category, the input data $h^{part}$ is zero-padded to have a size that follows the form of $2^n$ (where n is an integer) and is then converted to the delay dimension using a $2^n$-point IFFT to help reduce power consumption. The "delay dimension" refers to a dimension that represents the time delay between different signals or events in a system. Other techniques to adjust a signal length can be used instead of (or in addition to) zero-padding. For example, interpolation of the input data $h^{part}$ may be performed to obtain an appropriate data size (e.g., a $2^n$ data size).

Referring to FIG. 3, input data is partitioned and provided as $h_{freq}$, and zero-padded to reach size $2^n$ for IFFT transformation prior to encoding. After encoding, the latent vector z may be transmitted from the UE to the BS, and decoded. FFT transformation may be performed to generate $\hat{h}_{freq}$, and the portion corresponding to the zero-padded length may be discarded (thrown away). The number of zero-padded RBs to discard may be determined based on the input size $2^n$.

To handle different cases effectively, the UE may use five encoders with different input sizes in the delay dimension (e.g., 16, 32, 64, 128, and 256, respectively). More or less encoders may be used. Table 1, below, summarizes the five categories with the number of RBs and the corresponding IFFT sizes.

TABLE 1

| Category No. | 1 | 2 | 3 | 4 | 5 |
|---|---|---|---|---|---|
| RB(=K) | 1~16 | 17~32 | 33~64 | 65~128 | 129~273 |
| IFFT size | 16 | 32 | 64 | 128 | 256 |

Accordingly, set $\mathcal{D}$ in Equation 6, above, may be viewed as a set of five distributions $\{D_1, D_2, \ldots, D_5\}$, and $D_i$ as an underlying distribution of the zero-padded CSI vector in i-th category. The precoding function $p_{D_i}$ may be zero-padded to have $2^{(i+3)}$ elements and applying $2^{(i+3)}$-point IFFT.

Latent space generalization will now be described.

Latent space generalization involves creating an AE framework that can support multiple compression ratios.

Two baseline approaches may be considered. The first baseline approach involves training a decoder and encoder pair for each specific latent vector size $\lambda_i \in \Lambda$ by minimizing the loss function.

Figure 4:
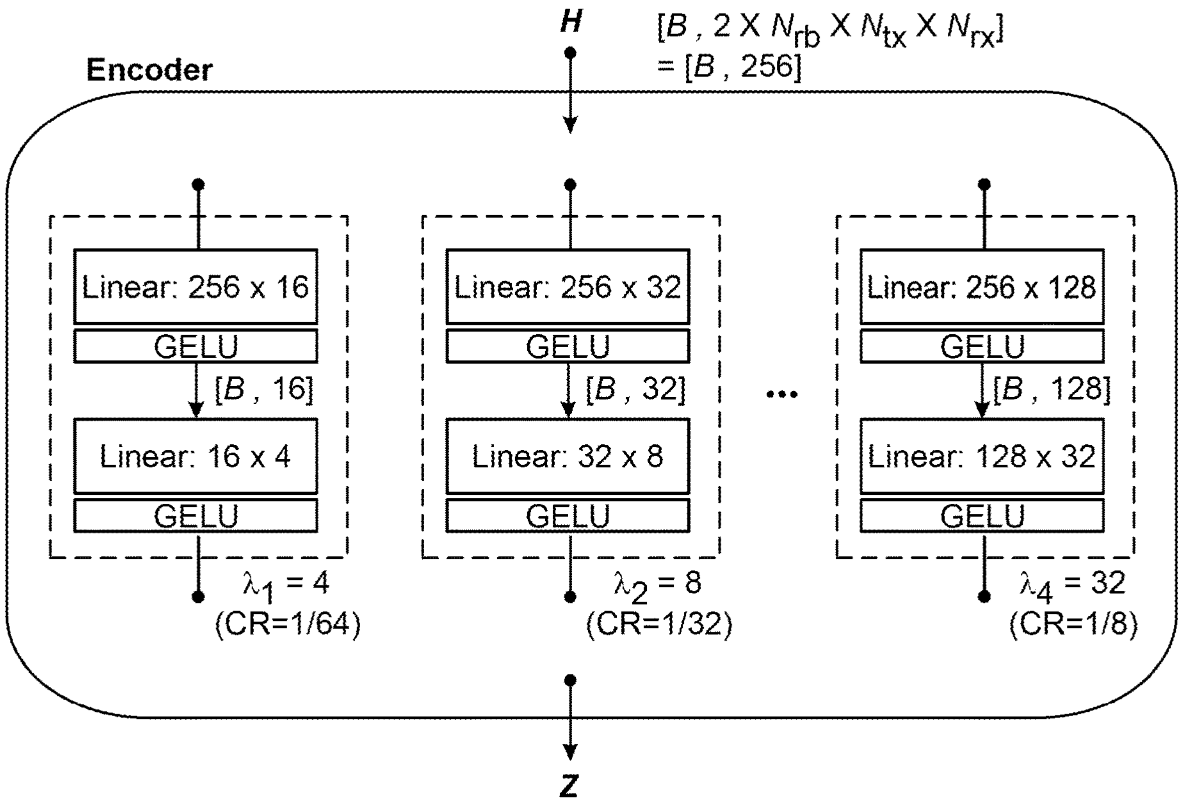
FIG. 4 illustrates an MLP encoder, based on a first baseline approach, according to an embodiment.

FIG. 4 illustrates an MLP encoder, based on a first baseline approach, according to an embodiment.

Referring to FIG. 4, an example of the MLP architecture to support $\Lambda=\{\lambda_1, \lambda_2, \lambda_3, \lambda_4\}=\{4, 8, 16, 32\}$ is illustrated (where "B" is a batch size, "CR" is a compression ratio, and "GELU" is a Gaussian Error Linear Unit). However, this approach is not very efficient in terms of the number of parameters required (e.g., too many parameters may be required yielding a relatively imprecise result).

The second baseline approach proposes a multiple compression ratio network called self-attention learning and dense refine (SALDR).

Figure 5:
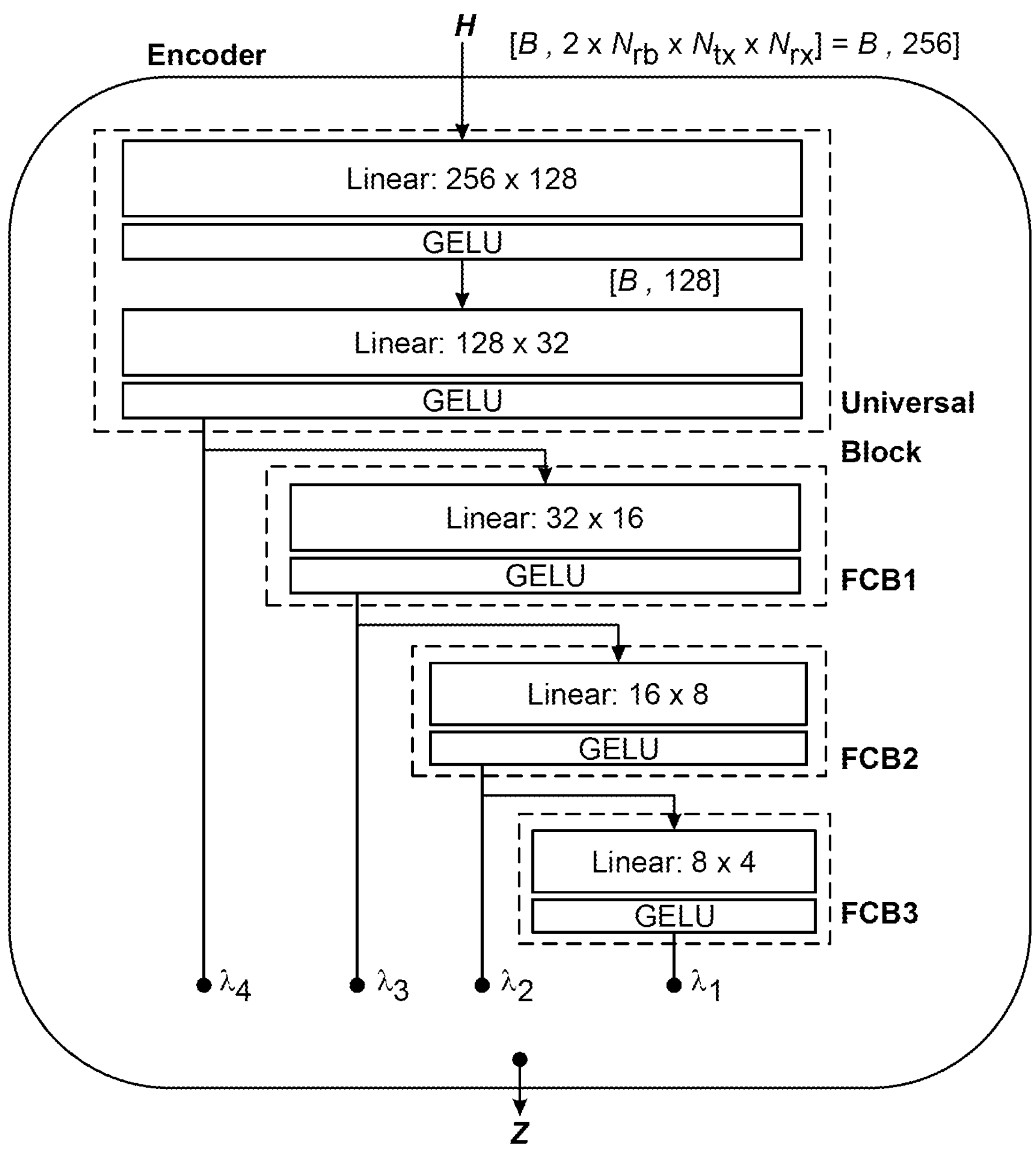
FIG. 5 illustrates an MLP encoder, based on a second baseline approach, according to an embodiment.

FIG. 5 illustrates an MLP encoder, based on a second baseline approach, according to an embodiment.

Referring to FIG. 5, this encoder includes a universal block and serial compression layers (where "FCB" stands for fully-connected block). The universal block first extracts CSI features of size $\lambda_{max}=\lambda_4$. Then, fully connected layers sequentially compress the latent vectors with smaller and smaller compression ratios. Using the universal block significantly reduces HW complexity compared to the first approach.

However, this second baseline approach has two limitations. First, during the inference phase, the latency to generate the latent vector of the smallest size can be quite large. Second, this architecture becomes challenging to extend when dealing with a large cardinality of A (e.g., when the encoder needs to support many compression ratios). This is because adding even one more element to A may require an additional fully connected layer, making the network more complex and computationally expensive.

Figure 6:
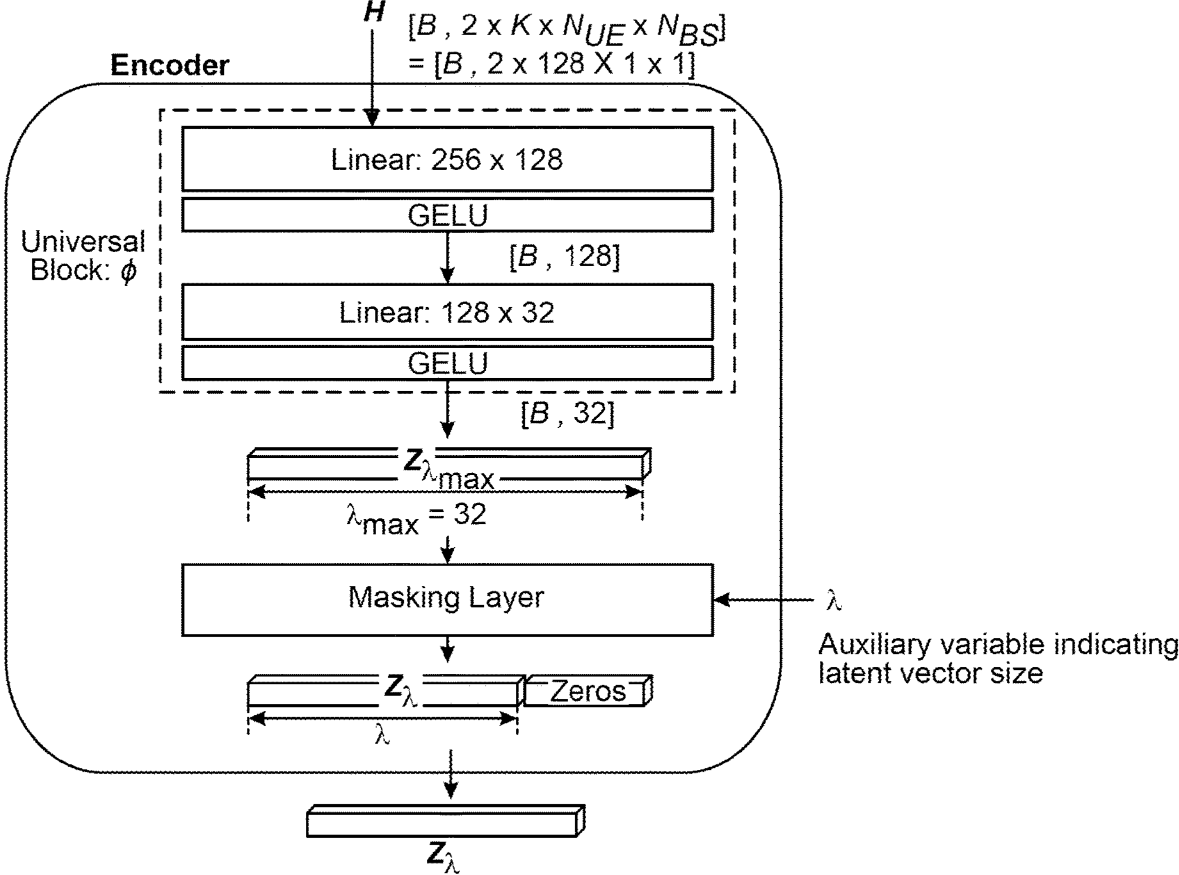
FIG. 6 illustrates an MLP encoder having a latent space generalization architecture, based on a two-layer approach, according to an embodiment.

To address the challenges posed by supporting multiple latent vector sizes ($\lambda$) in an AE, the latent space generalization architecture shown in FIG. 6 is proposed.

FIG. 6 illustrates an MLP encoder having a latent space generalization architecture, based on a two-layer approach, according to an embodiment.

Referring to FIG. 6, the architecture includes two parts: a universal encoding block and a masking layer.

Referring to FIG. 6, the universal block is responsible for extracting CSI features of a largest latent vector size $\lambda_{max}$ that the AE should support. The universal block can be applied using any deep neural network model. Then, the masking layer takes the output of the universal block and bypasses the first $\lambda$ elements output from the universal block (e.g., setting the first $\lambda$ elements to their original values) while making all other elements zero. Accordingly, this auxiliary integer variable $\lambda$ (corresponding to the first $\lambda$ elements that are bypassed) may determine the size of the encoder output.

This latent space generalization architecture seeks to train the parameters of the universal block in such a way that elements in the earlier positions of the latent vector $z\lambda_{max}$ include more critical information than elements in later positions. This design enables the architecture to support a set of latent vector sizes $\Lambda$ with a large number of elements while maintaining a shorter inference latency, as it does not require additional blocks for each $\lambda \in \Lambda$. To achieve this, the loss function may be defined according to Equation 7, below.

$$D_{\phi,\theta_\lambda}(\lambda) = \mathbb{E}_h\left[\|h - g_\theta(f_\phi(h) \odot e_\lambda)\|_2^2\right] \quad \text{Equation 7}$$

where $e_\lambda \in \{0,1\}^d$ is a binary vector with the first $\lambda$ elements as 1 and the rest as 0. The $\odot$ symbol denotes an element-wise product. The total loss function is then defined according to Equation 8, below.

$$D_{\phi,\theta}(\Lambda) = \sum_{\lambda \in \Lambda} w_\lambda D_{\theta,\phi}(\lambda) \quad \text{Equation 8}$$

where $\Lambda=\{\lambda_1, \lambda_2, \ldots, \lambda_{max}\}$ is a set of latent vector sizes. The weight coefficients $\{w_\lambda\}_{\lambda \in \Lambda}$ correspond to the relative impact of each $\lambda$ element in the latent vector, and they satisfy $\Sigma_{\lambda \in \Lambda} w_\lambda = 1$. The parameters of the encoder and decoder are trained to minimize the total loss function $D_{\phi,\theta}(\Lambda)$, which can be expressed according to Equation 9, below.

$$\phi^{univ}, \{\theta_\lambda^{opt}\}_{\lambda\in\Lambda} = \arg\min_{\phi,\theta_\lambda} \sum_{\lambda\in\Lambda} w_\lambda D_{\theta,\phi}(\lambda) \quad \text{Equation 9}$$

The weight coefficients $\{w_\lambda\}_{\lambda\in\Lambda}$ ability to indicate a relative importance of each λ element in the latent vector helps generate the distribution of the reconstruction loss with respect to each $\lambda\in\Lambda$, and their values can be determined through hyper-parameter tuning. In addition, reinforcement learning can be explored as a potential method to optimize these weight coefficients $\{w_\lambda\}_{\lambda\in\Lambda}$.

Comparing each of the three MLP encoders in FIGS. 4-6, each of the encoders have almost the same performance in terms of NMSE and BLER while the third encoder (FIG. 6) has a smaller storage and computational complexity than the first encoder (FIG. 4) or the second encoder (FIG. 5).

In addition, the third encoder (FIG. 6), can significantly reduce the number parameters used as compared to the first encoder (FIG. 4). The reduction in the number of parameters used can increase as the cardinality of the set $\Lambda=\{\lambda_1, \lambda_2, \ldots, \lambda_{max}\}$ becomes larger.

Additionally, the third encoder (FIG. 6) has a smaller latency than the second encoder (FIG. 5), as the second encoder sequentially applies the fully connected layers to reduce the latent vector size. This latency gap can be larger when the cardinality of the set $\Lambda=\{\lambda_1, \lambda_2, \ldots, \lambda_{max}\}$ becomes larger.

Accordingly, in the third encoder (FIG. 6), HW storage complexity and latency is independent of the cardinality of the set $\Lambda=\{\lambda_1, \lambda_2, \ldots\}$, while in the first and second encoders, these values linearly increase as the cardinality of the set Λ increases.

In some systems, BLER performance of compression ratios may be degraded when training deep neural networks with an objective function of sum loss based on Equation 3, above. A fine-tuning approach inspired by transfer learning, which allows a source task to affect the inductive bias of a target task, may be used to address this issue. The approach involves freezing some layers that include general information while training other layers for a specific task.

Transfer learning with deep neural networks typically involves fine-tuning a model pre-trained on a source task using data from a target task. Bottom layers containing general information along with the source and target task are frozen, and upper layers are fine-tuned with the target dataset. The fine-tuning approach, disclosed herein, involves freezing common layers containing general information along with all the compression ratios, and then parameters dedicated to each compression ratio are sequentially trained with a reconstructive loss objective function of each compression ratio.

Figure 7:
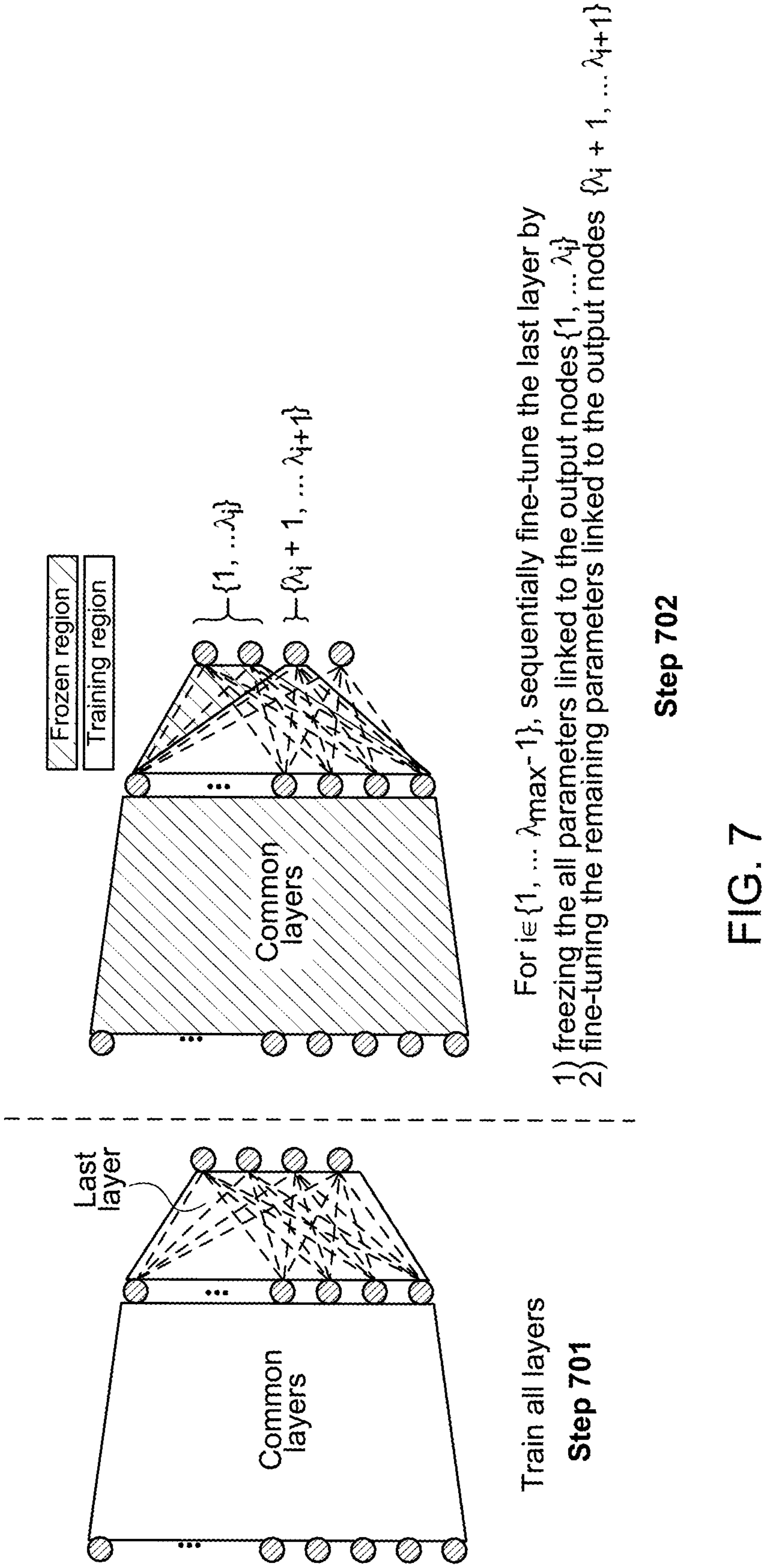
FIG. 7 illustrates a two-step fine-tuning routine, according to an embodiment.

FIG. 7 illustrates a two-step fine-tuning routine, according to an embodiment.

Referring to FIG. 7, in Step 701, all layers in the encoder are trained using the sum loss objective function in Equation 9, above, over all compression ratios. In step 702, the weight parameters of the last layers are sequentially fine-tuned while keeping the weight parameters in the common layers frozen. Common layers may include general information along with all compression ratios. Thus, some parameters are frozen, and others are trained. Additionally, step 702 may be divided into multiple sub-steps, and in each sub-step, the weight parameters may be sequentially fine-tuned and dedicated to a specific compression ratio.

For example, in step 701, the weight parameters linked to the first elements of the latent vector $\lambda_1$ (e.g., 4) may be trained using the reconstruction loss objective function in Equation 7 with a latent vector of size $\lambda_1$. In step 702, the parameters trained in step 701 may be frozen, and the weight parameters linked to elements spanning $\lambda_1+1$ to $\lambda_2$ may be trained using the reconstruction loss objective function in Equation 7 with a latent vector of size $\lambda_2$. Step 702 may be repeated, such that the weight parameters linked to the elements spanning $\lambda_1+1$ to $\lambda_2$ may be frozen and a subsequent set of weight parameters (e.g., linked to elements $\lambda_2+1$ to $\lambda_3$, up to $\lambda_{max}$) may be trained.

In addition, partial CSI compression is proposed. Partial CSI compression may be performed when the input and output type of the AE (e.g., including CSI information) is not limited to a raw channel matrix $H\in\mathbb{R}^{2\times K\times N_{BS}\times N_{UE}}$ Partial CSI compression may be implemented based on a raw partial channel matrix or a precoding vector (e.g., using singular value decomposition (SVD)) to perform partial CSI compression to allow the encoder structure to remain agnostic to UE configurations (e.g., the number of UE antennas). Using the raw partial channel matrix has the benefit of enabling the BS to perform more computations, however a feedback rate may be negatively affected, particularly when $N_{UE}>>N_s$. Using SVD advantageously may improve the feedback rate, but the processing by the UE may be negatively affected.

Accordingly, when performing partial CSI compression, the input of the encoder can be adjusted such that CSI information may be independent of the UE configurations. For instance, the encoder may use a raw partial channel matrix (e.g., selected according to channel power or channel capacity), or a precoding vector (e.g., selected singular vectors) as input to be compressed.

To avoid sending an entire raw partial channel, a partial channel may be sent when the number of UE antennas $N_{UE}$ is larger than the number of layers $N_s$. For example, the UE may select up to $N_s$ antennas and compress the partial channel with the selected antennas. Antenna selection may be performed by the UE by selecting the first $N_s$ antenna; selecting an $N_s$ antenna having the largest channel power; or by selecting an $N_s$ antenna such that channel capacity is maximized.

Accordingly, using a partial channel matrix as the input to the AE may reduce the feedback overhead while the reconstruction performance loss may be negligible.

Figure 8:
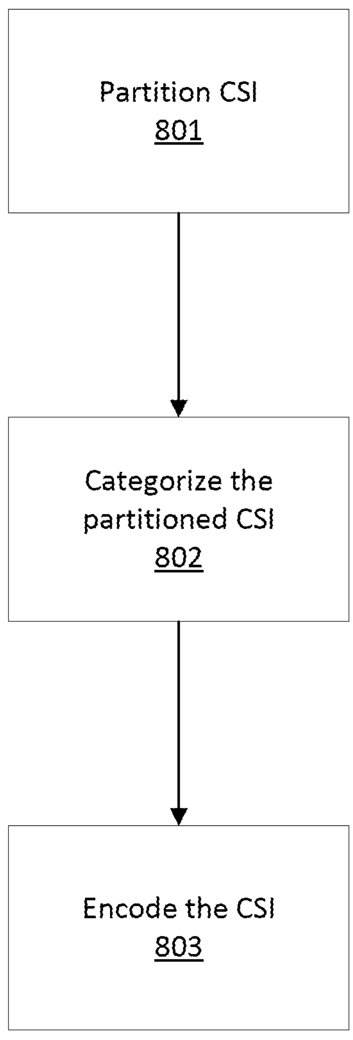
FIG. 8 is a flowchart illustrating a method of encoding CSI, according to an embodiment.

FIG. 8 is a flowchart illustrating a method of encoding CSI, according to an embodiment. The steps included in FIG. 8 may be performed by an electronic device (e.g., a UE or a base station).

Referring to FIG. 8, in step 801, the CSI is partitioned. As described above, the CSI may be partitioned into one or more discrete elements according to a dimension, such frequency, a number of antennas of a base station (e.g., a number of base station antennas in a network), and/or a number of antennas of a user equipment (e.g., a number of user equipment antennas in a network). In addition, antennas for one or more base stations may be included in the number of antennas of a base station, and antennas for one or more user equipment may be included in the number of antennas of a user equipment.

In step 802, the partitioned CSI is categorized into a number of bins, such that each of the bins have an equal length. Zero-padding may be used to ensure that each of the partitioned CSI have an equal length.

In step 803, the CSI is encoded. This may include encoding the categorized partitioned CSI (from step 802). The CSI may be transmitted from a UE to a BS after it is encoded. In addition, the CSI may also be encoded based on the steps discussed in FIG. 9, below.

Figure 9:
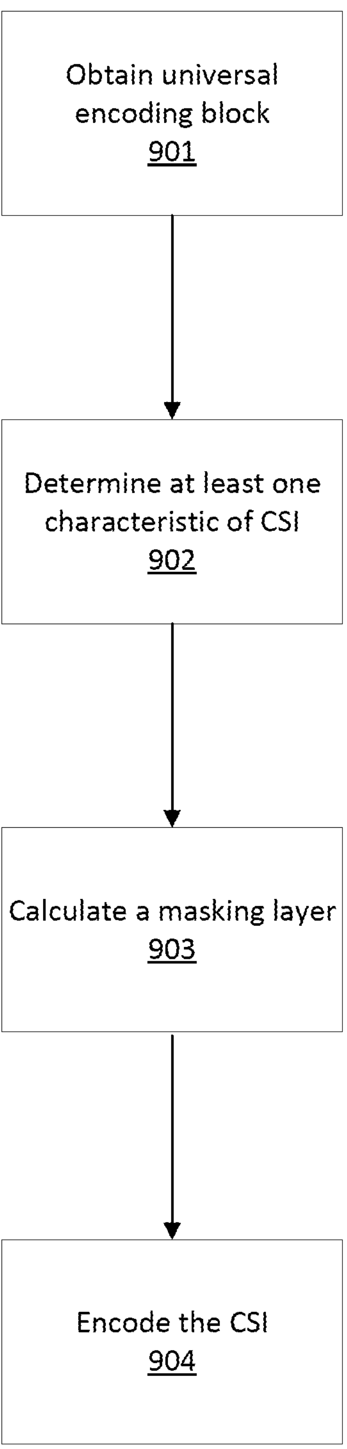
FIG. 9 is a flowchart illustrating a method of encoding CSI, according to an embodiment.

FIG. 9 is a flowchart illustrating a method of encoding CSI, according to an embodiment. The steps included in FIG. 9 may be performed by an electronic device (e.g., a UE or a base station).

Referring to FIG. 9, in step 901, a universal encoding block is obtained. The universal encoding block may be a component or module designed to handle a wide range of input data configurations or types, and to create latent representations that are agnostic to the specific input data characteristics.

In step 902, at least one characteristic of the CSI is determined. The CSI may be included in the universal encoding block, and the at least one characteristic may correspond to a latent vector size.

In step 903, a masking layer is calculated. The masking layer may be calculated based on the latent vector size. In step 904, the CSI is encoded based on the masking layer to obtain encoded data having a length corresponding to the latent vector size. The CSI may be transmitted from a UE to a BS after it is encoded.

Figure 10:
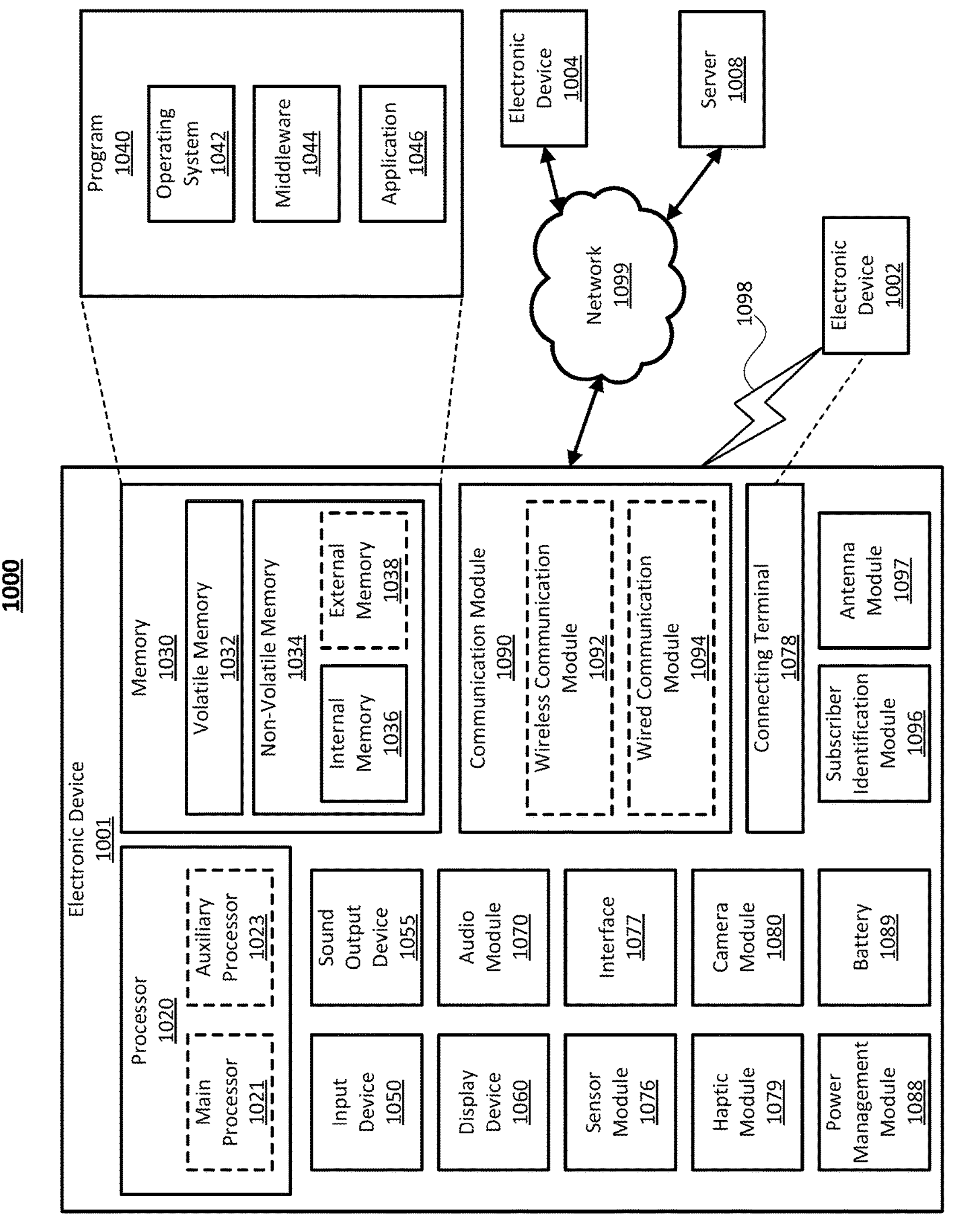
FIG. 10 is a block diagram of an electronic device in a network environment, according to an embodiment.

FIG. 10 is a block diagram of an electronic device in a network environment, according to an embodiment.

As discussed above, the electronic device described herein may be a UE and/or a BS. Furthermore, the electronic device may include the structural components and be included in a network environment described in the block diagram of FIG. 10.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1097. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034. Non-volatile memory 1034 may include internal memory 1036 and/or external memory 1038.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as BLUETOOTH™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
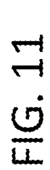
FIG. 11 shows a system including a UE and a gNB in communication with each other.

FIG. 11 shows a system including a UE 1105 and a gNB 1110, in communication with each other. The UE may include a radio 1115 and a processing circuit (or a means for processing) 1120, which may perform various methods disclosed herein. For example, the processing circuit 1120 may receive, via the radio 1115, transmissions from the network node (gNB) 1110, and the processing circuit 1120 may transmit, via the radio 1115, signals to the gNB 1110.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by an electronic device, comprising:

partitioning channel state information (CSI) into one or more discrete elements based on a predetermined dimension;

categorizing the partitioned CSI into one or more bins having an equal length;

extracting, using a universal encoding block, CSI features of a maximum latent vector size;

generating a masking layer having first elements set to one and remaining elements set to zero, wherein a number of the first elements is less than or equal to the maximum latent vector size;

applying the masking layer to an output of the universal encoding block; and encoding the categorized partitioned CSI to obtain encoded data having a length corresponding to the number of first elements.

2. The method of claim 1, wherein encoding the categorized partitioned CSI further comprises encoding the categorized partitioned CSI irrespective of a size of the partitioned CSI.

3. The method of claim 1, wherein the predetermined dimension is based on at least one of a frequency, a number of base station antennas, and a number of user equipment antennas.

4. The method of claim 1, further comprising:

zero-padding or interpolating at least one of the one or more categorized partitioned CSI bins to achieve the equal length among each of the bins.

5. The method of claim 1, wherein encoding the categorized partitioned CSI further comprises:

determining at least one characteristic of the partitioned CSI included in the universal encoding block corresponding to the maximum latent vector size.

6. The method of claim 5, further comprising:

calculating the masking layer based on the latent vector size by bypassing one or more elements positioned towards a front end of a vector output from the universal encoding block, and setting a remaining number of elements included in the vector to zero, wherein the partitioned CSI is encoded using the masking layer.

7. The method of claim 5, further comprising:

calculating the masking layer based on the latent vector size, wherein the partitioned CSI is encoded using the masking layer, and wherein the masking layer is configured to support CSI having a plurality of different compression ratios.

8. The method of claim 1, wherein the maximum latent vector size is a maximum latent vector size capable of being encoded.

9. The method of claim 1, further comprising:

training at least one parameter over all compression ratios;

freezing the at least one parameter over all the compression ratios corresponding to an output node; and fine-tuning a second parameter linked to the output node.

10. An electronic device, comprising:

a memory device, and a processor configured to execute instructions stored on the memory device, wherein the instructions cause the processor to:

partition channel state information (CSI) into one or more discrete elements based on a predetermined dimension;

categorize the partitioned CSI into one or more bins having an equal length;

extract, using a universal encoding block, CSI features of a maximum latent vector size;

generate a masking layer having first elements set to one and remaining elements set to zero, wherein a number of the first elements is less than or equal to the maximum latent vector size;

apply the masking layer to an output of the universal encoding block; and encode the categorized partitioned CSI to obtain encoded data having a length corresponding to the number of first elements.

11. The electronic device of claim 10, wherein encoding the categorized partitioned CSI further comprises encoding the categorized partitioned CSI irrespective of a size of the partitioned CSI.

12. The electronic device of claim 10, wherein the predetermined dimension is based on at least one of a frequency, a number of base station antennas, and a number of user equipment antennas.

13. The electronic device of claim 10, wherein the processor is further configured to:

zero-pad or interpolate at least one of the one or more categorized partitioned CSI bins to achieve the equal length among each of the bins.

14. The electronic device of claim 10, wherein encoding the categorized partitioned CSI further comprises:

determining at least one characteristic of the partitioned CSI included in the universal encoding block corresponding to the maximum latent vector size.

15. The electronic device of claim 14, wherein encoding the categorized partitioned CSI further comprises calculating the masking layer based on the latent vector size by bypassing one or more elements positioned towards a front end of a vector output from the universal encoding block, and setting a remaining number of elements included in the vector to zero, and wherein the categorized partitioned CSI is encoded using the masking layer.

16. The electronic device of claim 14, wherein encoding the categorized partitioned CSI further comprises calculating the masking layer based on the latent vector size, wherein the categorized partitioned CSI is encoded using the masking layer, and wherein the masking layer is configured to support CSI having a plurality of different compression ratios.

17. The electronic device of claim 10, wherein the maximum latent vector size is a maximum latent vector size capable of being encoded.

18. The electronic device of claim 10, wherein the processor is further configured to:

train at least one parameter over all compression ratios;

freeze the at least one parameter over all the compression ratios corresponding to an output node; and fine-tune a second parameter linked to the output node.

19. A method performed by an electronic device, comprising:

obtaining a universal encoding block;

determining at least one characteristic of channel state information (CSI) included in the universal encoding block corresponding to a maximum latent vector size;

generating a masking layer having first elements set to one and remaining elements set to zero, wherein a number of the first elements is less than or equal to the maximum latent vector size;

applying the masking layer to an output of the universal encoding block; and encoding the CSI based on the masking layer to obtain encoded data having a length corresponding to the number of first elements.

20. An electronic device, comprising:

a memory device, and a processor configured to execute instructions stored on the memory device, wherein the instructions cause the processor to:

obtain a universal encoding block;

determine at least one characteristic of channel state information (CSI) included in the universal encoding block corresponding to a maximum latent vector size;

generate a masking layer having first elements set to one and remaining elements set to zero, wherein a number of the first elements is less than or equal to the maximum latent vector size;

apply the masking layer to an output of the universal encoding block; and encode the CSI based on the masking layer to obtain encoded data having a length corresponding to the number of first elements.

* * * * *